(12) United States Patent
Narasimha et al.

(10) Patent No.: US 9,955,431 B2
(45) Date of Patent: Apr. 24, 2018

(54) METHOD AND APPARATUS FOR POWER HEADROOM REPORTING DURING MULTI-CARRIER OPERATION

(75) Inventors: Murali Narasimha, Lake Zurich, IL (US); Gerrit W. Hiddink, Utrecht (NL); Ravi Kuchibhotla, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 641 days.

(21) Appl. No.: 13/210,543

(22) Filed: Aug. 16, 2011

(65) Prior Publication Data
US 2012/0218904 A1 Aug. 30, 2012

Related U.S. Application Data

(60) Provisional application No. 61/374,610, filed on Aug. 17, 2010.

(51) Int. Cl.
| | |
|---|---|
| *H04W 52/14* | (2009.01) |
| *H04W 52/36* | (2009.01) |
| *H04L 5/00* | (2006.01) |
| *H04W 52/16* | (2009.01) |
| *H04W 52/32* | (2009.01) |
| *H04W 72/12* | (2009.01) |

(52) U.S. Cl.
CPC ........... *H04W 52/146* (2013.01); *H04L 5/001* (2013.01); *H04W 52/365* (2013.01); *H04L 5/0007* (2013.01); *H04W 52/16* (2013.01); *H04W 52/325* (2013.01); *H04W 72/1268* (2013.01)

(58) Field of Classification Search
CPC . H04W 52/146; H04W 52/16; H04W 52/325; H04W 52/365; H04L 5/0007; H04L 5/001
USPC ........................................................ 370/329
See application file for complete search history.

(56) References Cited

U.S. PATENT DOCUMENTS 6,377,809 B1 4/2002 Resaiifar et al.
7,492,737 B1 2/2009 Fong et al.
(Continued)

FOREIGN PATENT DOCUMENTS

JP 2006-505195 A 2/2006
JP 2012-507960 A 3/2012
(Continued)

OTHER PUBLICATIONS

Patent Cooperation Treaty, "PCT Search Report and Written Opinion of the International Searching Authority" for International Application No. PCT/US2011/047988 dated Jan. 13, 2012, 26 pages.
(Continued)

*Primary Examiner* — Jeffrey M Rutkowski
*Assistant Examiner* — Mandish Randhawa
(74) *Attorney, Agent, or Firm* — Lerner, David, Littenberg, Krumholz & Mentlik, LLP (57) ABSTRACT

A method in a wireless communication terminal supports aggregated carrier access. The terminal is configured to transmit a power headroom report of a first type, determine that a condition for transmission of a power headroom report of a second type is satisfied, and transmits a power headroom report of the second type. In other embodiments, essential power headroom reports are prioritized over non-essential power headroom reports.

11 Claims, 4 Drawing Sheets

(56) References Cited

U.S. PATENT DOCUMENTS

| | | | |
|---|---|---|---|
| 7,693,032 | B2 | 4/2010 | Li et al. |
| 2006/0280142 | A1 | 12/2006 | Damnjanovic et al. |
| 2006/0280145 | A1* | 12/2006 | Revel ............... H04W 72/1278 370/331 |
| 2008/0130589 | A1 | 6/2008 | Gorokhov et al. |
| 2009/0279500 | A1 | 11/2009 | Luo et al. |
| 2010/0040004 | A1 | 2/2010 | Damnjanovic et al. |
| 2010/0091725 | A1 | 4/2010 | Ishii |
| 2010/0098012 | A1 | 4/2010 | Bala et al. |
| 2010/0111023 | A1 | 5/2010 | Pelletier et al. |
| 2010/0113004 | A1 | 5/2010 | Cave et al. |
| 2010/0118805 | A1 | 5/2010 | Ishii et al. |
| 2010/0157895 | A1 | 6/2010 | Pani et al. |
| 2010/0158147 | A1 | 6/2010 | Zhang et al. |
| 2010/0226327 | A1 | 9/2010 | Zhang et al. |
| 2010/0227569 | A1 | 9/2010 | Bala et al. |
| 2010/0232373 | A1 | 9/2010 | Nory et al. |
| 2010/0232382 | A1* | 9/2010 | Gauvreau ............. H04W 72/02 370/329 |
| 2010/0238882 | A1 | 9/2010 | Zhang et al. |
| 2010/0246463 | A1 | 9/2010 | Papaskellariou et al. |
| 2010/0272019 | A1 | 10/2010 | Papaskellariou et al. |
| 2010/0272091 | A1 | 10/2010 | Fabien et al. |
| 2010/0273515 | A1 | 10/2010 | Fabien et al. |
| 2010/0273520 | A1 | 10/2010 | Pelletier et al. |
| 2012/0008552 | A1* | 1/2012 | Baldemair et al. ........... 370/328 |
| 2012/0082041 | A1* | 4/2012 | Damnjanovic et al. ...... 370/252 |
| 2012/0269148 | A1* | 10/2012 | Hultell et al. ................ 370/329 |
| 2013/0028231 | A1* | 1/2013 | Zhang et al. ................. 370/329 |
| 2013/0155984 | A1* | 6/2013 | Marinier et al. ............. 370/329 |

FOREIGN PATENT DOCUMENTS

| | | |
|---|---|---|
| KR | 10-2009-0101786 A | 9/2009 |
| WO | 2004040797 A1 | 5/2004 |
| WO | 2004056009 A1 | 7/2004 |
| WO | 2008108228 A1 | 9/2008 |
| WO | 2009040773 A2 | 4/2009 |
| WO | 2010051513 A2 | 5/2010 |
| WO | 2010051514 A1 | 5/2010 |
| WO | 2010065759 A2 | 6/2010 |
| WO | 2011126311 A2 | 10/2011 |

OTHER PUBLICATIONS

3GPP TSG RAN WG3 #70bis, R2-103724 "Discussion on CC specific PHR reporting" ZTE, Stockholm, Sweden, Jun. 28-Jul. 2, 2010, 4 pages.
3GPP TSG RAN WG2 #70bis, R2-103725 "Parallel transmission of two types PHR" ZTE, Stockholm, Sweden, Jun. 28-Jul. 2, 2010, 6 pages.
3GPP TSG RAN WG2 #70bis, R2-103665 "Analysis on the open issues of PHR for carrier aggregation" New Postcom, Stockholm, Sweden, Jun. 28-Jul. 2, 2010, 4 pages.
3GPP TSG RAN WG2 #70, R2-102879 "Considerations on PHR for CA" Alcatel-Lucent Shanghai Bell, Alcatel-Lucent, Montreal, Canada, May 10-14, 2010, 4 pages.
Japanese Patent Office, First Office Action for Japanese Patent Application No. 2012-503787 dated Feb. 4, 2013, 3 pages.
3GPP TSG RAN WG2 Meeting #70, 3GPP TSG RAN WG1 Meeting #61, Montreal, Canada, May 10-14, 2010, R1-103405, "LS on Power Headroom Reporting for Carrier Aggregation" Montreal, Canada, May 10-14, 2010, R2-103445, 1 page.
3GPP TS 36.321 V8.4.0 (Dec. 2008), 3rd Generation Partnership Project; Technical Specification Group Radio Access Network; Evolved Universal Terrestrial Radio Access (E-UTRA Medium Access Control (MAC) Protocol Specification (Release 8).
3GPP TSG RAN WG2 Meeting #66; Report on Email Discussion on "U-Plane Aspects for DC HSUPA" Draft Version 01; San Francisco, United States, May 3-7, 2009; R2-09xxxx, 4 pages.
3GPP TSG RAN WG1 Meeting #56;PUSCH Power Control for LTE_Advanced; Athens, Greece, Feb. 9-13, 2009; R1-090738.
3GPP TS 36.331 V8.5.0 (Mar. 2009); 3rd Generation Partnership Project; Technical Specification Group Radio Access Network; Evolved Universal Terrestrial Radio Access (E-UTRA) Radio Resource Control (RRC); Protocol Specification (Release 8).
3GPP TS 25.321 V8.4.0 (Dec. 2008), 3rd Generation Partnership Project; Technical Specification Group Radio Access Network; Medium Access Control (MAC) Protocol Specification (Release 8).
3GPP TS 25.331 V8.5.0 (Dec. 2008), 3rd Generation Partnership Project; Technical Specification Group Radio Access Network; Radio Resource Control (RRC); Protocol Specification (Release 8).
3GPP TS 25.214 V8.5.0 (Mar. 2009), 3rd Generation Partnership Project; Technical Specification Group Radio Access Network; Physical Layer Procedures (FDD) (Release 8).
3GPP TS 36.331 V8.4.0 (Dec. 2008), 3rd Generation Partnership Project; Technical Specification Group Radio Access Network; Evolved Universal Terrestrial Radio Access (E-UTRA) Radio Resource Control (RRC); Protocol Specification (Release 8).
3GPP TS 36.133 V8.4.0 (Dec. 2008), 3rd Generation Partnership Project; Technical Specification Group Radio Access Network; Evolved Universal Terrestrial Radio Access (E-UTRA); Requirements for Support of Radio Resource Management (Release 8).
3GPP TS 36.213 V8.6.0 (Mar. 2009), 3rd Generation Partnership Project; Technical Specification Group Radio Access Network; Evolved Universal Terrestrial Radio Access (E-UTRA); Physical Layer Procedures (Release 8).
U.S. Appl. No. 12/43,886 Fabien et al., filed Apr. 27, 2009, Non-Final Rejection dated Dec. 12, 2010, 11 pages.
Patent Cooperation Treaty, "PCT Invitation to Pay Additional Fees and, Where Applicable, Protest Fees" for International Application No. PCT/US2010/030970 dated Nov. 4, 2010, 5 pages.
Patent Cooperation Treaty, "PCT Search Report and Written Opinion" for International Application No. PCT/US2010/030970 dated Feb. 10, 2011, 18 pages.
3GPP TSG RAN WG1 Meeting #56BIS; "PUSCH Power Control for LTE-Advanced" Nokia Siemens Networks, Nokia; Seoul, Korea, Mar. 23-27, 2009; R1-091372, 4 pages.
3GPP TSG RAN WG2 Meeting #71, R2-104806 "Primary Cell Change" Motorola, Madrid, Spain, Aug. 23-27, 2010, 3 pages.
3GPP TSG RAN WG2 Meeting #71, R2-104807 "Further Details on Power Headroom Reporting" Motorola, Madrid, Spain, Aug. 23-27, 2010, 2 pages.
United States Patent & Trademark Office, "Non-Final Rejection" for U.S. Appl. No. 12/430,883 dated Jun. 23, 2011, 10 pages.
United States Patent & Trademark Office, "Final Rejection" for U.S. Appl. No. 12/430,886 dated Jul. 7, 2011, 14 pages.
Extended European Search Report dated Jul. 4, 2016, for European Patent Application No. 16173685.5.
European Patent Office, "Extended European Search Report" for Patent Application No. 13153038.8 dated Jun. 5, 2013, 10 pages.

* cited by examiner

METHOD AND APPARATUS FOR POWER HEADROOM REPORTING DURING MULTI-CARRIER OPERATION

CROSS-REFERENCE TO RELATED APPLICATIONS

The present application claims benefits under 35 U.S.C. 119(e) to U.S. Provisional Application No. 61/374,610 filed on 17 Aug. 2010, the contents of which are incorporated herein by reference.

FIELD OF THE DISCLOSURE

The present disclosure relates generally to wireless communications and, more particularly, to power headroom reporting in multi-carrier wireless communication systems.

BACKGROUND

In multi-carrier systems with carrier aggregation, a user terminal may be coupled to or monitor adjacent multiple carriers associated with the same or multiple base stations. The user terminal may also be coupled to or monitor multiple carriers associated with the same or different base stations in different frequency bands. Additionally, asymmetric carrier aggregation is possible in frequency division duplex (FDD) mode with different numbers of downlink and uplink carriers aggregated for a user terminal. Under these circumstances, one or more of the downlink/uplink carriers do not have a corresponding or associated uplink/downlink carrier (fixed channel spacing). It may also be possible that only a subset of carriers being aggregated (e.g., carriers served by a base station) have a common scheduler (possibly a common MAC entity) resulting in multiple independent schedulers for different subsets of the aggregated carriers. When configured to monitor multiple carriers, the user terminal may have a designated "primary carrier". The other carriers of the multiple carriers are referred to as "secondary carriers". Thus the user terminal may have a downlink primary carrier, a uplink primary carrier, one or more downlink secondary carriers and one or more uplink secondary carriers. A downlink carrier and the associated uplink carrier (if such an uplink carrier is configured) are referred to as paired carriers.

In some multi-carrier systems, generally, transmit power control (TPC) can be configured independently for different aggregated uplink carriers or a subset of aggregated uplink carriers. Independent TPC may be used to support different quality of service (QoS) requirements, different traffic types with different block error rate (BLER) operating points and different interference levels (IoT) levels across different aggregated carriers. In some implementations, multiple PAs serve multiple aggregated carriers, for example, aggregation across different frequency bands with a power amplifier for each band.

Per-component carrier TPC and closed-loop power control (PC) commands also provide an additional degree of freedom to adjust UE power in addition to modulation coding scheme (MCS) adaptation, for example, near the lowest/highest MCS settings. In 3GPP LTE, per-component carrier TPC requires the definition and signaling of carrier-specific open loop power control parameters such as $P_0$, $\alpha$ and PL and possibly closed loop PC command $\delta_{PUSCH}/\delta_{PUCCH}$. In the following description independent power control for the different carriers is assumed. However, the details are also applicable for the case when common power control is performed for a group or subset of carriers.

A component carrier specific power control has also been proposed in R1-090738. The LTE Rel-8 power control for a single carrier can be straightforwardly extended to support component carrier specific power control as suggested in R1-090738.

The various aspects, features and advantages of the invention will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

Figure 1:
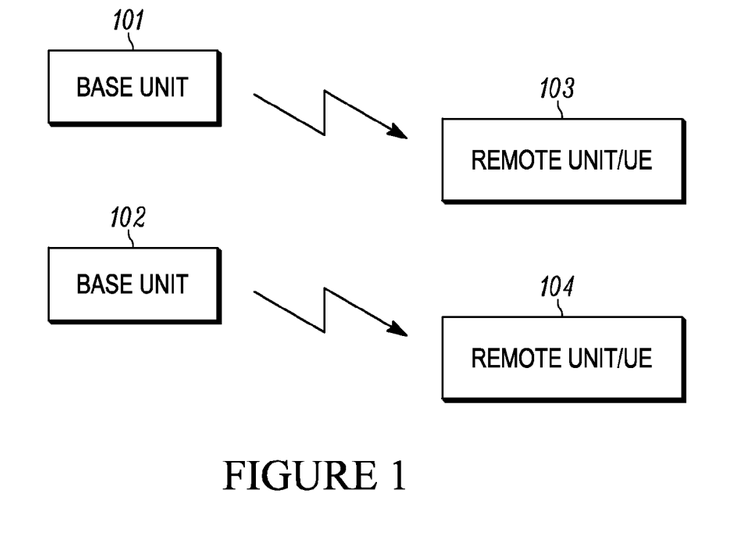
FIG. 1 illustrates a multi-carrier wireless communication system.

In FIG. 1, a multi-carrier wireless communication system 100 comprises one or more fixed base infrastructure units 101, 102 forming a network distributed over a geographical region for serving remote units in the time and/or frequency and/or spatial domain. A base unit may also be referred to as an access point, access terminal, base, base station, Node-B, eNode-B, Home Node-B, Home eNode-B, relay node, or by other terminology used in the art. The one or more base units each comprise one or more transmitters for downlink transmissions and one or more receivers for receiving uplink transmissions. The base units are generally part of a radio access network that includes one or more controllers communicably coupled to one or more corresponding base units. The access network is generally communicably coupled to one or more core networks, which may be coupled to other networks like the Internet and public switched telephone networks among others. These and other elements of access and core networks are not illustrated but are known generally by those having ordinary skill in the art.

In FIG. 1, the one or more base units serve a number of remote units 103, 104 within a corresponding serving area, for example, a cell or a cell sector, via a wireless communication link. In one implementation, the remote units support aggregated carrier access. The remote units may be fixed or mobile. The remote units may also be referred to as subscriber units, mobiles, mobile stations, users, terminals, subscriber stations, user equipment (UE), user terminals, wireless communication devices, or by other terminology used in the art. The remote units also comprise one or more transmitters and one or more receivers. The base unit 101 transmits downlink communication signals to serve remote unit 103 in the time and/or frequency and/or spatial domain. The remote unit 104 communicates with base unit 102 via uplink communication signals. Sometimes the base unit is referred to as a "serving" or connected or primary cell for the remote unit. The remote units may have half duplex (HD) or full duplex (FD) transceivers. Half-duplex transceivers do not transmit and receive simultaneously whereas full duplex terminals do. The remote units may also communicate with the base unit via a relay node.

Figure 2:
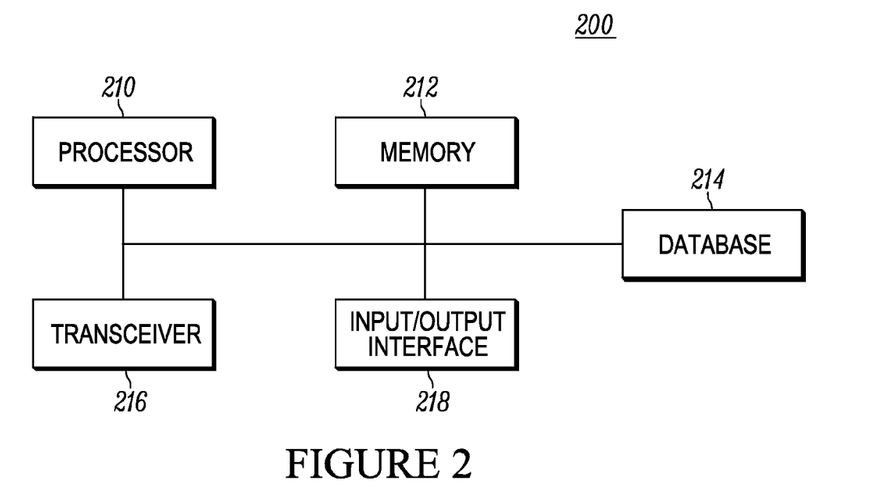
FIG. 2 illustrates a wireless communication terminal.

In FIG. 2, a wireless communication terminal 200 comprises a controller/processor 210 communicably coupled to memory 212, a database 214, a transceiver 216, input/output (I/O) device interface 218 connected through a system bus. The wireless communication terminal 200 may be implemented as a base unit or a remote unit and is compliant with the protocol of the wireless communication system within which it operates, for example, the 3GPP LTE Rel-8 or a later generation wireless communication protocol. The controller/processor 210 may be implemented as any programmed processor. However, the functionality described herein may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. The memory 212 may include volatile and non-volatile data storage, including one or more electrical, magnetic or optical memories such as a random access memory (RAM), cache, hard drive, read-only memory (ROM), firmware, or other memory device. The memory may have a cache to speed access to specific data. Data may be stored in the memory or in a separate database. The database interface 214 may be used by the controller/processor to access the database. The transceiver 216 is capable of communicating with user terminals and base stations pursuant to the wireless communication protocol implemented. In some implementations, e.g., where the wireless unit communication is implemented as a user terminal, the wireless communication unit includes an I/O device interface 218 that connects to one or more input devices that may include a keyboard, mouse, pen-operated touch screen or monitor, voice-recognition device, or any other device that accepts input. The I/O device interface may also connect to one or more output devices, such as a monitor, printer, disk drive, speakers, or any other device provided to output data.

In one implementation, the wireless communication system is compliant with the Third Generation Partnership Project (3GPP) Universal Mobile Telecommunications System (UMTS). In another implementation, the wireless communication system is compliant with the 3GPP Universal Mobile Telecommunications System (UMTS) LTE protocol, also referred to as EUTRA or some later generation thereof, wherein the base unit transmits using an orthogonal frequency division multiplexing (OFDM) modulation scheme on the downlink and the user terminals transmit on the uplink using a single carrier frequency division multiple access (SC-FDMA) scheme. In yet another implementation, the wireless communication system is compliant with the 3GPP Universal Mobile Telecommunications System (UMTS) LTE-Advanced protocol, also referred to as LTE-A or some later generation or release of LTE thereof, wherein the base unit can transmit using an orthogonal frequency division multiplexing (OFDM) modulation scheme on a single or a plurality of downlink component carriers and the user terminals can transmit on the uplink using a single or plurality of uplink component carriers. More generally the wireless communication system may implement some other open or proprietary communication protocol, for example, WiMAX, among other existing and future protocols. The disclosure is not intended to be implemented in any particular wireless communication system architecture or protocol. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading. The architecture in which the features of the instant disclosure are implemented may also be based on simpler time and/or frequency division multiplexing/multiple access techniques, or a combination of these various techniques. In alternate embodiments, the wireless communication system may utilize other communication system protocols including, but not limited to, TDMA or direct sequence CDMA. The communication system may be a TDD (Time Division Duplex) or FDD (Frequency Division Duplex) system.

Figure 3:
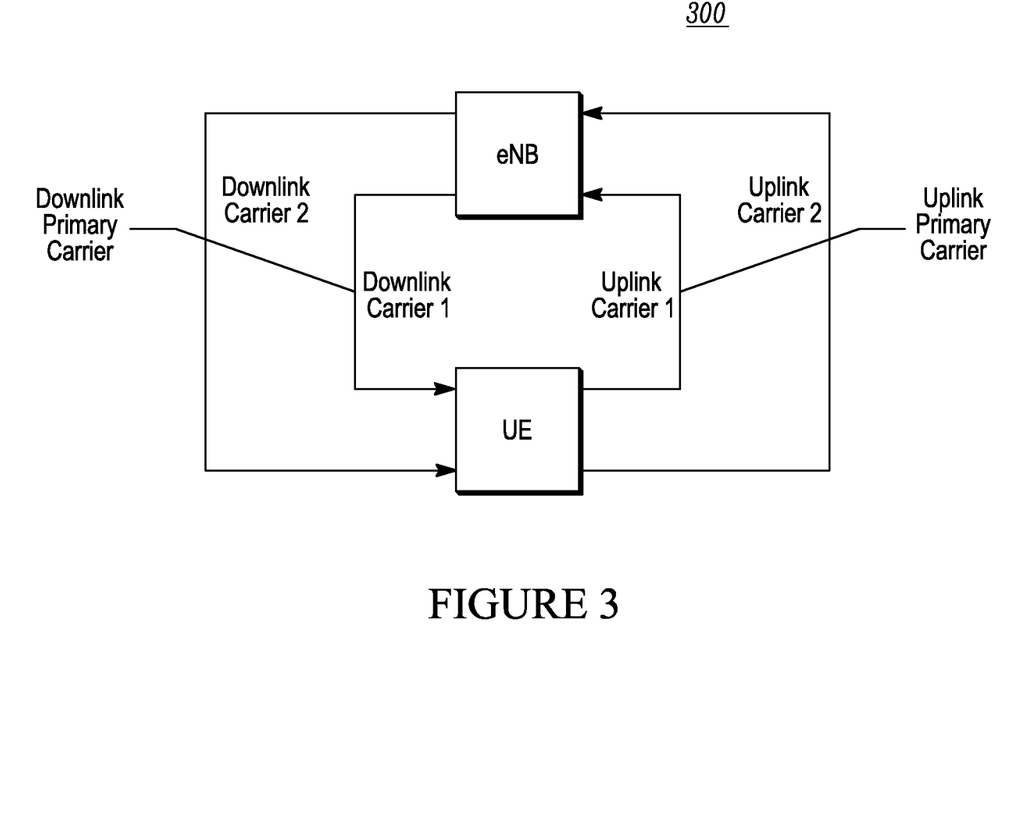
FIG. 3 illustrates a wireless communication system configured for carrier aggregation operation.
Figure 4:
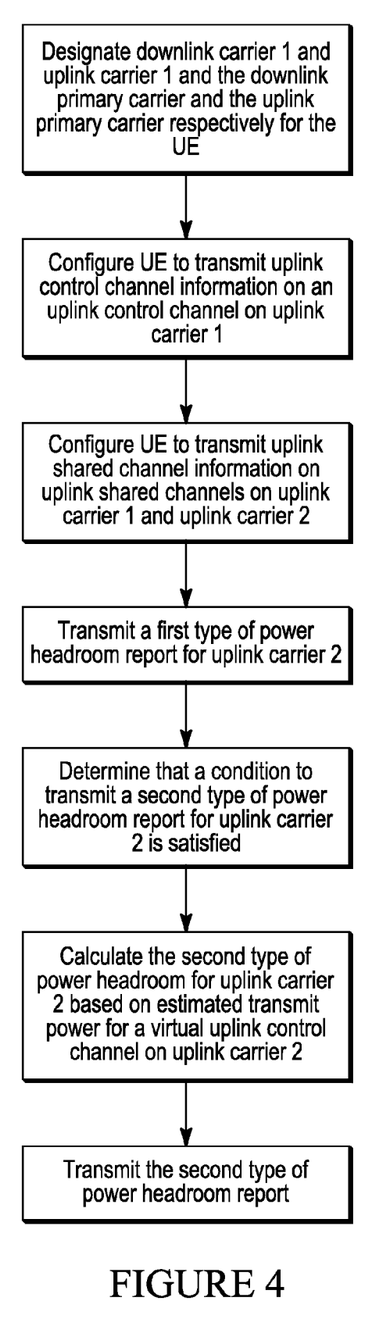
FIG. 4 illustrates a first embodiment.

The disclosure relates generally to efficient transmission of UE Power Headroom Reports (PHRs) with carrier aggregation and more specifically uplink carrier aggregation with component carriers belonging to or associated with the same base station or with different base stations (possibly with different schedulers). The carriers that are jointly scheduled may be explicitly or implicitly indicated to the UE by a broadcast message, a scheduling grant/assignment or by higher-layer such as RRC (Radio Resource Control) signaling. FIG. 3 illustrates a wireless communication system 300 configured for carrier aggregation operation comprising an eNB that transmits to a UE on downlink (DL) carrier 1 and DL carrier 2. The UE transmits to the eNB on uplink (UL) carrier 1 and UL carrier 2. In FIG. 3, DL carrier 1 is designated the primary DL carrier and UL carrier 1 is designated the primary UL carrier. In FIG. 4 at 410, the primary DL and UL carriers are designated for the UE. Similar designations are made in FIG. 5 at 510.

Efficiency of component carrier-specific power control can be improved by utilizing component carrier-specific power headroom reports (PHRs). The power headroom of all or a subset of the aggregated component carriers can be included in a PHR report. Additionally, for an architecture with a single power amplifier (PA) serving a group of component carriers, there may be a need for an aggregate PA headroom report corresponding to the aggregated signal constructed from the component signals of each carrier, for example, a primary and as well as component carriers. The UE can be configured by UE-specific higher layer signaling such as a radio resource control (RRC) to report power headroom for all or a subset of the aggregated carriers. The PHR can be periodic and/or it may be triggered based on changes in any component carrier's downlink path loss by a certain network configured offset (and expiry of the prohibitPHR-Timer as in 3GPP LTE Rel-8). Thus, the UE or wireless communication terminal may transmit the power headroom report only when a time elapsed from a previous power headroom report is greater than a time-elapsed timer threshold.

A combined PHR report including the power headroom for each or a subset of the aggregated component carriers configured by UE-specific higher layer signaling such as component carriers with the highest and lowest power headroom, component carriers with the highest and next highest power headroom, primary carrier and component carriers with the highest power headroom, with carrier identification information such as relative carrier index, PCID (Physical Cell ID), Global Cell ID etc. may be generated to signal the power headroom of the component carriers in an efficient manner. For example, the PHR report can comprise the power headroom of the primary carrier along with possibly a differential value for the other component carrier. Thus, in one embodiment, the power headroom of the at least one additional carrier may be encoded as a differential power headroom relative to the power headroom of the first carrier.

Figure 5:
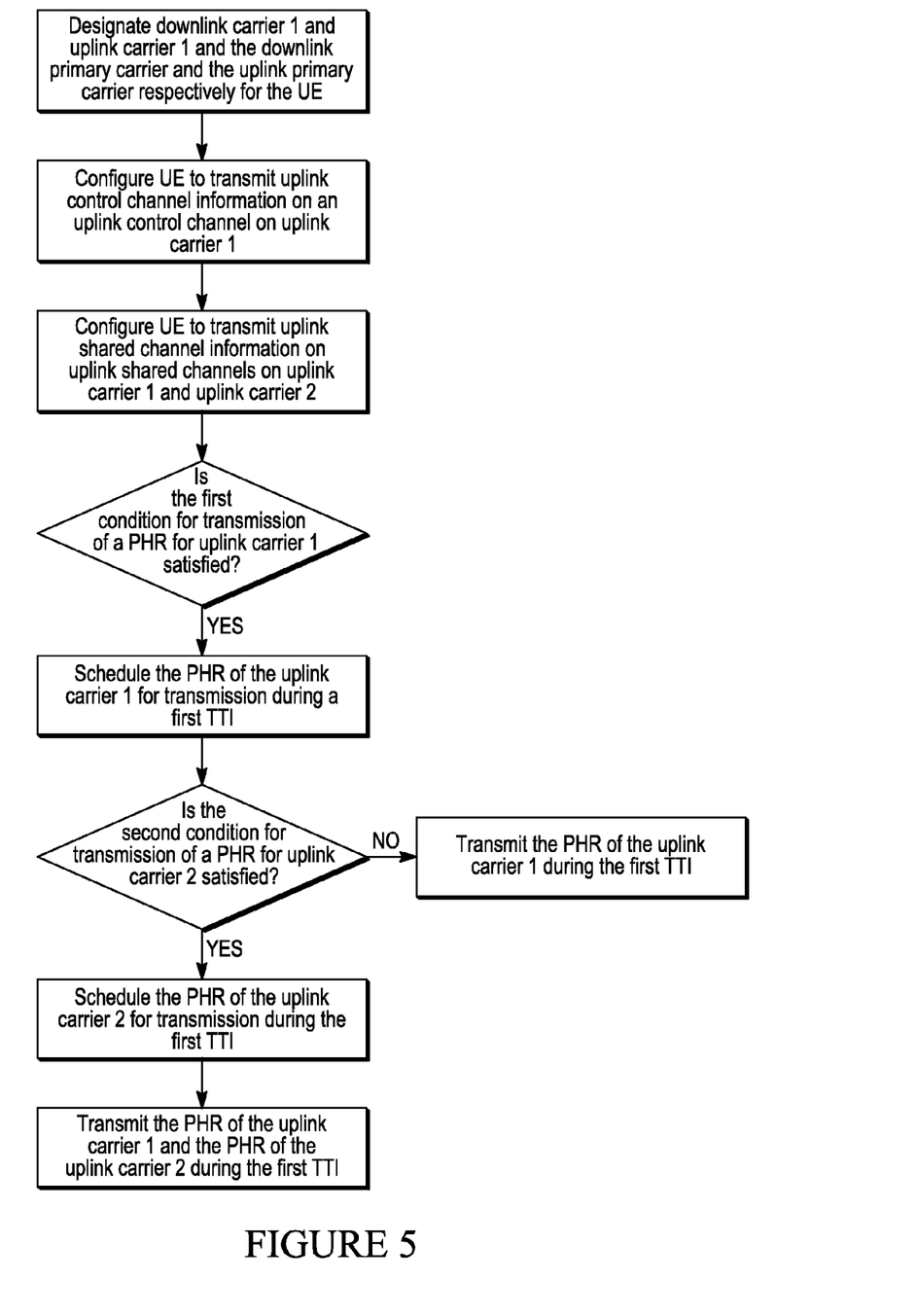
FIG. 5 illustrates a second embodiment.

A wireless communication device configured for carrier aggregation operation is configured to transmit an uplink control channel on the uplink primary carrier. FIG. 4 illustrates such a configuration at 420 and FIG. 5 illustrates such a configuration at 520. In LTE the uplink control channel, also referred to as physical uplink control channel (PUCCH) carries HARQ ACK/NACK indications, Channel quality indicators (CQI) and Scheduling requests (SR). Furthermore, the device may not transmit the uplink control channel on any of the one or more uplink secondary carriers. Uplink shared channels, also known as physical uplink shared channels (PUSCH), can be transmitted on the uplink primary carrier and any of the one or more uplink secondary carriers, subject to scheduling by the base station. Configuration of the UE to transmit UL shared channel information on UL carriers 1 and 2 is illustrated at 430 in FIG. 4 and at 530 in FIG. 5. Therefore, the device may transmit both an uplink control channel and an uplink shared channel on the uplink primary carrier. Two types of power headroom can be defined. A first type of power headroom, also referred to as type 1 PHR, is based on the transmission of only an uplink shared channel on an uplink carrier, and is calculated as follows:

$$PH_{type1} = P_{cmax} - \text{PUSCH power}$$

where is the $P_{cmax}$ is the maximum UE power on the uplink carrier and PUSCH power is the estimated transmit power of the PUSCH.

A second type of power headroom, also referred to as type 2 PHR, is based on the transmission of both an uplink control channel and an uplink shared channel on an uplink carrier, and is calculated as follows:

$$PH_{type2} = P_{cmax} - \text{PUCCH power} - \text{PUSCH power}$$

where $P_{cmax}$ and PUSCH power are as defined above and PUCCH power is the estimated transmit power of the PUCCH.

According to the above definition, $PH_{type2}$ can only be calculated when the UE transmits the PUCCH and the PUSCH in the same TTI or subframe. It is advantageous to have a type 2 PHR in other situations as well. For example, when the uplink primary carrier of a UE needs to be changed from a first uplink carrier to a second uplink carrier, it is necessary to establish that the second uplink carrier can support the transmission of both the PUCCH and the PUSCH in the same TTI before performing the change of the uplink primary carrier. The UE may be power constrained on the second uplink carrier due to uplink interference, due to required additional power reduction to minimize out-of-band emissions, due to signal conditions or due to any other reason. If the UE is power constrained it may not be able to support transmission of both the PUCCH and PUSCH in the same TTI, and consequently the attempted change of primary uplink carrier can result in a connection failure.

Accordingly a first embodiment is described that enables the transmission of type 2 PHRs for uplink carriers on which the UE is not configured to transmit an uplink control channel. A UE transmits a type 1 PHR for a second uplink carrier over a first uplink carrier, as illustrated at 440 in FIG. 4. Subsequently a condition that requires the transmission of a type 2 PHR is satisfied, as illustrated at 450 in FIG. 4. The UE transmits a type 2 PHR for the second uplink carrier. The second uplink carrier can be an uplink secondary carrier. The first uplink carrier can be the uplink primary carrier or any other configured uplink carrier. Since the UE is not configured to transmit uplink control channel information on an uplink control channel over the second uplink carrier, the UE needs a virtual uplink control channel to calculate $PH_{type2}$. Specifically, the virtual uplink control channel is not a channel actually transmitted by the UE; instead it represents a hypothetical transmission used to enable the calculation of the type 2 PHR and consequently determine whether the UE can adequately support the transmission of a PUCCH and PUSCH in the same TTI on the uplink carrier. The UE can compute the type 2 PHR by estimating the transmit power of an uplink shared channel on the second uplink carrier and by estimating the transmit power of the virtual uplink control channel, as illustrated at 460 in FIG. 4.

The configuration parameters for the virtual uplink control channel can be obtained from a base station via dedicated signaling or from a system information broadcast. Alternatively, the configuration parameters for the virtual uplink control channel can be assumed to be the same as the corresponding parameters for the uplink control channel transmitted on the uplink primary carrier. Examples of configuration parameters for the PUCCH are described in 3GPP Technical Specification 36.331:

```
PUCCH-ConfigCommon ::=      SEQUENCE {
    deltaPUCCH-Shift            ENUMERATED
                                {ds1, ds2, ds3},
    nRB-CQI                     INTEGER (0..98),
    nCS-AN                      INTEGER (0..7),
    n1PUCCH-AN                  INTEGER (0..2047)
}
PUCCH-ConfigDedicated ::=   SEQUENCE {
    ackNackRepetition           CHOICE{
        release                     NULL,
        setup                       SEQUENCE {
            repetitionFactor            ENUMERATED
                                        {n2, n4, n6, spare1},
            n1PUCCH-AN-Rep              INTEGER (0..2047)
        }
    },
    tdd-AckNackFeedbackMode     ENUMERATED {bundling,
                                multiplexing} OPTIONAL --
Cond TDD
}
-- ASN1STOP
```

TABLE

PUCCH-Config field descriptions deltaPUCCH-Shift
Parameter: $\Delta_{shift}^{PUCCH}$, see 36.211, 5.4.1, where ds1 corresponds to value 1 ds2 to 2 etc.
nRB-CQI
Parameter: $N_{RB}^{(2)}$, see TS 36.211 [21, 5.4].
nCS-An
Parameter: $N_{cs}^{(1)}$ see TS 36.211 [21, 5.4].
n1Pucch-AN
Parameter: $N_{PUCCH}^{(1)}$ see TS 36.213 [23, 10.1].
ackNackRepetition
Parameter indicates whether ACK/NACK repetition is configured, see TS 36.213 [23, 10.1].
repetitionFactor
Parameter $N_{ANRep}$ see TS 36.213 [23, 10.1] where n2 corresponds to repetition factor 2, n4 to 4.
n1Pucch-AN-Rep
Parameter: $n_{PUCCH, ANRep}^{(1)}$ see TS 36.213 [23, 10.1].
tdd-AckNackFeedbackMode
Parameter indicates one of the two TDD ACK/NACK feedback modes used, see TS 36.213 [23, 7.3]. Bundling corresponds to use of ACK/NACK bundling whereas, multiplexing corresponds to ACK/NACK multiplexing. The same value applies to both ACK/NACK feedback modes on PUCCH as well as on PUSCH. For TDD configuration 5, E-UTRAN should always set this field to bundling.

The condition that requires the transmission of a type 2 PHR can be a determination of a need to perform a change of the uplink primary carrier of the UE. For example, a base station to which the UE is attached may determine that the uplink primary carrier needs to be changed. The base station can indicate to the UE that the uplink primary carrier needs to be changed, and in response to such an indication, the UE can transmit one or more type 2 PHRs for one or more of the uplink secondary cells. FIG. 4 illustrates transmission of a type 2 PHR at 470. Alternatively, the condition that requires the transmission of a type 2 PHR can be any one of or a combination of one or more of the following: power headroom for the uplink primary cell being less than a threshold; power headroom for an uplink secondary cell is more than a threshold; power headroom for an uplink secondary cell is more than the power headroom for the uplink primary cell by at least a threshold; signal strength or signal quality of a downlink secondary carrier is better than or equal to the signal strength or signal quality of the downlink primary carrier; the pathloss on a downlink secondary carrier is less than the pathloss on the downlink primary carrier by at least a threshold; or there is significant interference on the downlink primary carrier or the uplink primary carrier. Significant interference can include radio conditions that result in increased bit error rate or less reliable decoding of transmissions.

The UE may not have an uplink grant for a PUSCH transmission on an uplink secondary carrier, when it is required to transmit a type 2 PHR for the uplink secondary carrier. In such a situation, the UE can transmit the type 2 PHR using the uplink grant on a different uplink carrier. In order to calculate $PH_{type2}$, the UE can assume a virtual uplink grant for the uplink secondary carrier. The virtual uplink grant represents a hypothetical resource allocation for computing $PH_{type2}$.

According to another embodiment the determination of whether a second uplink carrier is suitable as a primary uplink carrier can be done without using a type 2 PHR for the uplink carrier. The second uplink carrier can be an uplink secondary carrier or any other uplink carrier (for example, an uplink carrier not configured as the primary or a secondary uplink carrier). The UE can transmit a type 1 PHR and a type 2 PHR for the uplink primary carrier. The UE can also transmit a type 1 PHR for the second uplink carrier. The transmission of the type 1 and type 2 PHRs for the uplink primary carrier and the type 1 PHR for the second uplink carrier can occur in the same TTI, or the transmissions can be separated by a short time interval. For calculating the type 1 PHR for the second uplink carrier, the UE can use the uplink grant used for calculating the type 1 PHR for the uplink primary carrier. The eNB can obtain an estimate of the PUCCH transmit power by calculating the difference between the type 1 PHR and type 2 PHR on the uplink primary channel. The eNB can use the estimate of the PUCCH transmit power and the type 1 power headroom reported for the uplink secondary carrier to determine whether the uplink secondary carrier can adequately support transmission of the PUCCH and PUSCH in the same TTI. For example, if the type 1 power headroom reported for the uplink minus the estimate of the PUCCH-transmit power is zero or more, it can indicate that the UE can adequately support transmission of the PUCCH and PUSCH in the same TTI.

Alternatively, for calculating the type 1 PHR for the second uplink carrier, the UE can use an uplink grant signaled by the eNB for transmission on the second uplink carrier. For calculating the type 1 PHR and type 2 PHR for the uplink primary channel, the UE can use the uplink grant signaled by the eNB for transmission on the second uplink carrier. The eNB can obtain an estimate of the PUCCH transmit power by calculating the difference between the type 1 PHR and type 2 PHR on the uplink primary channel.

The UE can determine the need to send the type 1 PHR for the second uplink carrier based on one or more conditions. For example, the UE can send the type 1 PHR for the second uplink carrier when a need to change the uplink primary carrier from a first uplink carrier to the second uplink carrier is determined.

Additional embodiments are described that ensure that the base station receives critical power headroom information. Power headroom reports can be transmitted when a specified first condition is met (referred to as triggering of power headroom reports). Such PHRs can be referred to as "Essential PHRs". For example, a PHR of an uplink carrier can be transmitted when the UE observes that a measured pathloss for the downlink carrier paired to the uplink carrier has changed by more than a threshold amount since the previous transmission of a PHR of the uplink carrier. As another example, a PHR for an uplink carrier can be transmitted when a certain specified time duration has elapsed since the last transmission of a PHR for the uplink carrier. In a multi-carrier system, it is beneficial to have at the eNB power headroom information for all configured uplink carriers at substantially all times. Therefore, a UE can be configured to transmit PHRs for all configured uplink carriers even when only one of the PHRs is triggered. Transmitting of PHRs for all configured uplink carriers increases the overhead in the uplink transmissions. It should also be noted that transmitting the triggered PHRs to the network is critically important as the uplink scheduling depends on up-to-date power headroom information. Transmitting PHRs that are not triggered (i.e., PHRs that are transmitted even when a specified first condition is not met, also referred to as "Non-Essential PHRs") is less important.

According to another embodiment, the UE can determine that a first condition for transmission of a first PHR of a first uplink carrier is satisfied, as illustrated at 540 in FIG. 5. This condition can be a triggering condition such as a change of pathloss on an uplink carrier exceeding a threshold, or elapse of a specified time duration since the previous transmission of a PHR, as described above. The UE can then schedule the first PHR for transmission in a first time slot, such as a first TTI, as illustrated at 550 in FIG. 5. At 560, the UE determines whether a second condition is satisfied, in addition to the first condition being satisfied. At 570, the UE schedules a second PHR for transmission in the first time slot, if the second condition is satisfied in addition to the first condition being satisfied. The second PHR can be a PHR of a second uplink carrier different from the uplink carrier corresponding to the first PHR. The second PHR can be a non-essential PHR.

The second condition can be advantageously used to minimize the overhead due to transmitting non-essential PHRs. For example, the UE can schedule the second PHR for transmission only if the UE has received an uplink resource grant for uplink transmission on the second uplink carrier during a specified time duration. Thus, if a UE has not received an uplink resource grant for uplink transmission on second uplink carrier for the previous t milliseconds, it can stop scheduling PHRs for the second uplink carrier. Similarly, if the UE can schedule the second PHR for transmission only if the UE has received a downlink resource allocation for reception of downlink data on the downlink carrier paired to the second uplink carrier during a specified time duration. Thus, if a UE has not received a downlink resource allocation for reception of downlink data on the downlink carrier paired to the second uplink carrier for the previous t milliseconds, it can stop scheduling PHRs for the uplink carrier.

The second condition can be advantageously used to provide power headroom information when uplink scheduling on a particular carrier is likely to become necessary. For example, the UE can schedule the second PHR for transmission only if uplink buffer status indicates more than a threshold amount of buffered data. A higher quantity of buffered data can require the eNB to schedule uplink transmissions on additional uplink carriers and the UE can schedule PHRs of one or more of such additional uplink carriers for transmission, even if such PHRs are not triggered.

The second condition can also be used to prioritize the transmission of essential PHRs over the transmission of non-essential PHRs. For example, the UE can schedule a non-essential PHR for transmission only if it determines that the size of the uplink resource allocation is adequate for transmission of higher priority data and the non-essential PHR. The higher priority data can be signaling data from upper layers, buffer status reports and essential PHRs. The UE can also associate the essential PHRs to a first logical channel and the non-essential PHRs to a second logical channel. Different transmission priorities can be assigned to the first logical channel and the second logical channel. The transmission priority assigned to the first logical channel can be higher than the transmission priority assigned to the second logical channel. Consequently, the UE can schedule for transmission a non-essential PHR only when any essential PHRs to be transmitted in the same TTI are also scheduled for transmission or there are no essential PHRs to be transmitted in the same TTI.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication base station that supports aggregated carrier access by a mobile station, the method comprising:
    configuring, with the base station, a mobile station to operate a first uplink carrier as a primary uplink carrier;
    receiving, from the mobile station, a power headroom report of a first type for a second uplink carrier when the wireless communication device is not configured to transmit an uplink control channel on the second uplink carrier, the first type power headroom report being based on transmission of an uplink shared channel;
    receiving a power headroom report of a second type for the second uplink carrier; the power headroom of the second type being based on an estimated transmit power of a virtual uplink control channel and an estimated transmit power of the uplink shared channel, the virtual uplink control channel representing a virtual resource allocation;
    calculating a difference between the power headroom report of the first type and the power headroom report of the second type;
    determining, based on the calculation, whether the second uplink carrier can support transmission of the uplink control channel and the uplink shared channel in a same transmission time interval; and
    configuring, with the base station, in response to the determining, the mobile station to operate the second uplink carrier as the primary uplink carrier.

2. The method according to claim 1 further comprising transmitting to the mobile station one or more parameters corresponding to a virtual uplink control channel.

3. The method according to claim 1, further comprising:
    estimating a transmit power of a control channel of the primary uplink carrier; and
    determining, based on the estimate and at least one of the first type power headroom report and the second type power headroom report for the second uplink carrier, whether the second uplink carrier can serve as the primary uplink carrier.

4. The method of claim 1, further comprising sending to the mobile station an indication that the primary uplink carrier needs to be changed, wherein the power headroom report of a second type for the second uplink carrier is received in response to the indication.

5. A method in a wireless communication device that supports aggregated carrier access, the method comprising:
    determining that a first condition for transmitting a power headroom report is satisfied, the first condition including elapse of a specified time since a previous transmission of a power headroom report;
    scheduling a first power headroom report for transmission during a first time period when the first condition is satisfied;
    determining whether a second condition for transmitting a second power headroom report of a second uplink carrier is satisfied in addition to the first condition being satisfied, the second condition comprising
    determining that a resource allocation for reception of data on the downlink carrier paired to the second uplink carrier has been received within another elapsed time period; and
    scheduling, if the second condition for transmitting of the second power headroom report is satisfied in addition to the first condition being satisfied, a second power headroom report for transmission during the first time period.

6. The method according to claim 5 wherein the first power headroom report is a power headroom report of a first uplink carrier, and wherein the first condition comprises a change of a pathloss parameter value by more than a threshold amount since a previous transmission of a power headroom report of the first uplink carrier.

7. The method according to claim 5 wherein the first power headroom report is a power headroom report of a first uplink carrier, and wherein the first condition comprises elapse of a first time duration since a previous transmission of a power headroom report of the first uplink carrier.

8. The method according to claim 5 wherein the second condition comprises an uplink buffer status indicating more than a threshold amount of buffered data.

9. The method according to claim 5 further comprising:
    assigning a first priority to the first power headroom report and a second priority to the second power headroom report, the first priority higher than the second priority; and
    scheduling the second power headroom report when a size of an uplink resource allocation allows for transmission of both the first power headroom report and the second power headroom report.

10. The method according to claim 5 further comprising:
receiving an uplink resource grant and determining that the uplink resource grant can accommodate a first number of bits; and
determining that the number of bits required for transmission of at least the first power headroom report and the second power headroom report is no more than the first number of bits.

11. The method according to claim 5, further comprising:
transmitting the first power headroom report and the second power headroom report during the first time period.

\* \* \* \* \*